United States Patent

[11] 3,613,814

[72] Inventor: Walter F. Prien, Jr.
Woodhull, Ill.
[21] Appl. No. 32,644
[22] Filed Apr. 28, 1970
[45] Patented Oct. 19, 1971
[73] Assignee Outboard Marine Corporation
Waukegan, Ill.

[54] VARIABLE SPEED DRIVE FOR LAWN MOWER
8 Claims, 4 Drawing Figs.

[52] U.S. Cl. .................................................. 180/19 H,
74/194
[51] Int. Cl. ...................................................... F16h 15/08,
B62d 51/04
[50] Field of Search ............................................. 74/194;
180/6.62, 19 H

[56] References Cited
UNITED STATES PATENTS

| | | | |
|---|---|---|---|
| 2,735,307 | 2/1956 | Nordsieck ..................... | 74/194 |
| 2,852,083 | 9/1958 | Cavanaugh .................... | 180/19 |
| 2,978,052 | 4/1961 | Siwek ............................ | 180/19 |
| 3,527,112 | 9/1970 | Korell ........................... | 74/194 |

Primary Examiner—Arthur T. McKeon
Attorneys—Robert K. Gerling, Robert E. Clemency, John W. Michael, Gerrit D. Foster, Bayard H. Michael, Paul R. Puerner, Joseph A. Gemignani, Andrew O. Riteris and Spencer B. Michael ABSTRACT: Disclosed herein is a self-propelled lawn mower with a combined clutch and variable speed drive controlled by the mower handle. The drive includes a vertical or intermediate shaft driven by the engine output shaft and a horizontal cross-shaft which is drivingly connected to the mower wheels. The vertical shaft is provided with a friction drive wheel and the horizontal shaft is provided with a friction disc. Power is transferred from the vertical shaft to the horizontal shaft by an idler wheel which is supported on the horizontal shaft for movement in a radial direction with respect to the axis of the horizontal shaft and the friction disc. The position of the idler wheel is controlled by the mower handle through a link or rod. Forward movement of the mower handle causes the idler to float axially of the horizontal shaft into engagement with the friction disc and friction roller. Further forward movement of the mower handle causes radial movement of the idler toward the center of the friction disc to vary the drive ratio and change the rate of rotation of the mower wheels. Release of the mower handle causes disengagement of the drive.

Inventor
Walter F. O'Brien Jr.
By
Wheeler, Wheeler, House & Clemency
Attorneys

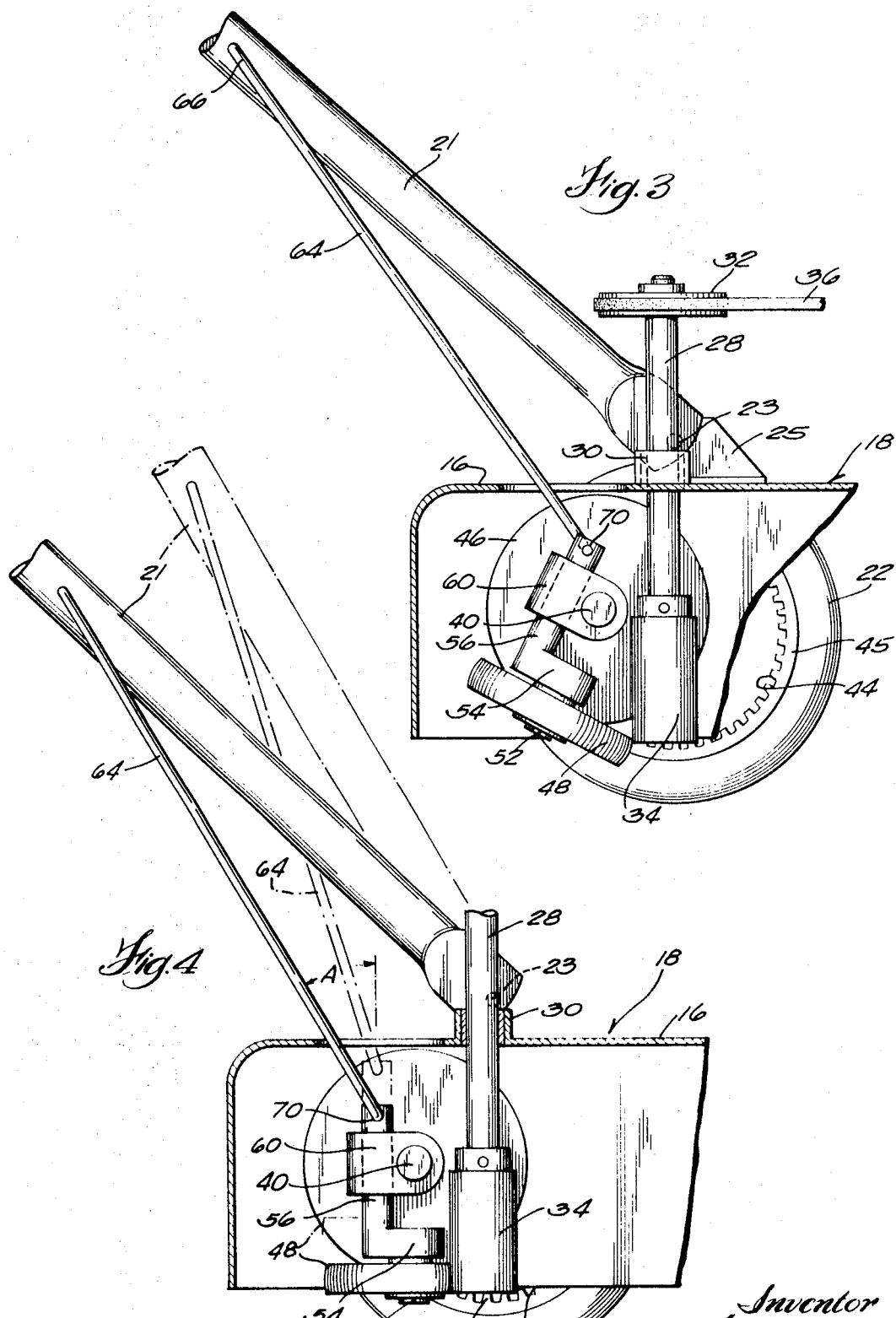

VARIABLE SPEED DRIVE FOR LAWN MOWER

BACKGROUND OF INVENTION

The invention relates to self-propelled lawn mowers wherein at least one mower wheel is driven by the engine to transport the mower along the ground.

SUMMARY OF THE INVENTION

The invention provides a self-propelled lawn mower which includes a combination variable speed drive and clutching arrangement for the driven mower wheels. The variable speed drive and clutch are controlled by the mower handle. The drive is disengaged or in neutral when the mower handle is at its rearwardmost position. The drive is engaged by forward movement of the mower handle about its pivotal connection with the blade housing. Continued forward movement of the mower handle changes the drive ratio between driving and driven members to vary the rate of rotation of the mower wheels. When the handle is released, rearward displacement of the handle by gravity or spring biasing disengages the drive.

More specifically, two oppositely located mower wheels are driven by a drive which includes an intermediate shaft rotatably supported on the mower housing for rotation about a vertical axis and a cross-shaft which is rotatably supported on the mower housing for rotation about a generally horizontal axis. The cross-shaft is connected to the mower wheels by an arrangement which includes internal teeth on the wheel hubs and pinion gears fixedly secured to the cross-shaft which mesh with the internal teeth.

The transmission of power from the intermediate shaft to the cross-shaft and thus to the rear wheels is afforded by an idler wheel which simultaneously engages a friction drum or wheel secured to the intermediate shaft and a friction disc fixedly secured to the cross-shaft. The means for supporting the idler wheel on the cross-shaft affords rotation of the idler wheel about a first rotational axis radial with respect to the cross-shaft and afford translatory radial movement along the radial axis of the idler wheel relative to the friction disc to vary the speed ratio between the friction roller and friction disc. The means for supporting the idler wheel also affords translatory movement of the idler wheel axially with regard to and on the cross-shaft to float the idler means into positive engagement with both the friction wheel and the friction disc. The means for supporting the idler also affords angular movement of the idler means about the axis of the cross-shaft to afford engagement and disengagement of the idler wheel with the friction roller to thereby provide a neutral condition with no power transmitted to the mower transmitted to the mower wheels.

The means for supporting the idler wheel is connected to a control lever or the mower handle by a control rod. When the control lever or the mower handle is in a first or rearwardmost position, the idler wheel is disengaged from the friction roller on the intermediate shaft. Forward movement of the mower handle to a second position causes angular movement of the rotational axis of the idler wheel about the cross-shaft to engage the idler wheel with the friction roller. Movement of the mower handle from the second position to the maximum forward or a third position provides a range of positions in which the radial position of the idler with respect to the friction disc is varied to thus provide an infinite number of speed ratios for any particular rate of rotation of the engine output shaft.

It is an object of the invention to provide a variable speed drive for the wheels of a self-propelled lawn mower with the speed variation controlled by the position of the lawn mower handle and to provide a dead man feature affording disengagement of the drive when the lawn mower handle is released.

It is a further object of the invention to provide a drive mechanism for the wheels of a lawn mower which includes a disengaged neutral condition and which provides smooth engagement of the drive and gradual increase in the rate of rotation of the driven mower wheels upon movement of a single control member to thus minimize marks in the lawn caused by momentary spinning of the wheels.

Further objects and advantages of the invention will become apparent from the following disclosure.

THE DRAWINGS

FIG. 3 is a fragmentary side elevational view, partially in section, showing the drive mechanism in a neutral condition.

FIG. 4 is a side elevational view, partially in section, showing the drive in a driving condition.

DETAILED DESCRIPTION

Figure 1:
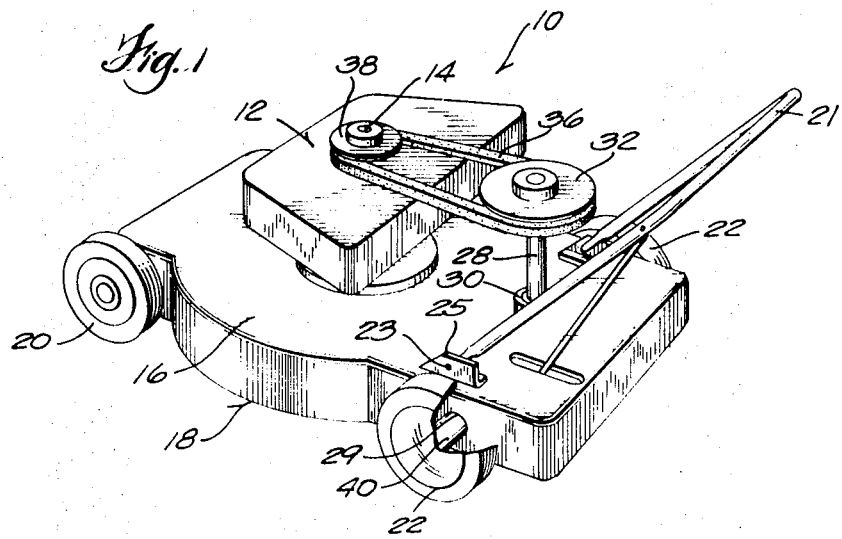
FIG. 1 is a perspective view of a lawn mower including a drive mechanism embodying various of the features of the invention.
Figure 2:
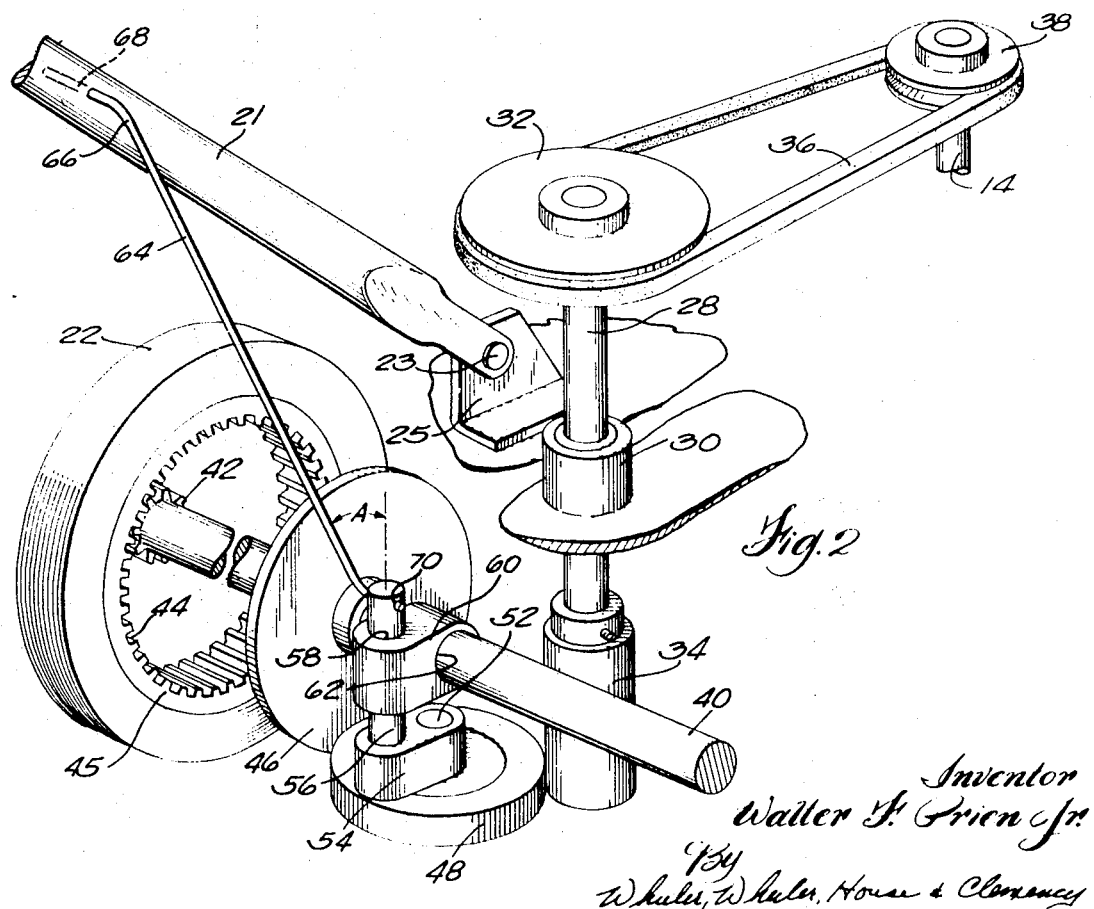
FIG. 2 is an enlarged fragmentary perspective view, partially in section, of the drive mechanism incorporated in the lawn mower shown in FIG. 1.

In the drawings, FIG. 1 shows a rotary lawn mower which is generally designated 10 and which includes an engine 12 having an output shaft 14. The engine 12 is supported on the deck 16 of the mower housing 18.

The mower 10 is supported for travel in adjacent relation to the ground by suitably rotatably mounted spaced front and rear wheels, respectively 20 and 22. The mower is guided by a mower handle 21 which is pivotally connected by pins 23 to upstanding ears 25 on the deck 16.

Means are provided for transferring power from the engine output shaft to the rear wheels 22. The means includes a first intermediate or vertical shaft 28 which is rotatably supported on the mower deck 16 by a boss 30. The vertical shaft 28 is connected to the engine output shaft by a pulley 32 which is fixedly secured to the first shaft 28 and a belt 36 which is reeved about the pulley 32 and about a pulley 38 fixedly secured to the engine output shaft 14.

The vertical shaft 28 is provided with first drive means in the form of a friction wheel or friction drive roller 34 which is fixed to the shaft 28.

The means for transferring power also includes a second shaft or horizontal cross-shaft 40 which is rotatably supported in apertures 29 in the mower housing 18. Pinion gears 42 secured to the cross-shaft 40 are in mesh with internal gears 44 on the wheel rims 45. A friction disc 46 is fixedly secured to shaft 40.

In accordance with the invention, power is transferred from the friction drive roller 34 to the driven disc 46 by an idler means in the form of a wheel 48. Means are provided for supporting the idler wheel 48 on the cross-shaft 40 to afford translatory axial or longitudinal movement of the idler means relative to the cross-shaft 40 to afford self-centering or self-alignment of the idler wheel 48 with the driven friction disc 46 and the friction drive roller 34. As disclosed, the means includes a stub shaft 52 which rotatably supports the idler wheel 48 for rotation about an axis radial with respect to the axis of the cross-shaft 40 and friction disc 46. The stub shaft 52 can be fixedly connected to a mounting block 54.

To afford radial movement of the idler wheel upon actuation of a control lever on the mower handle as hereinafter described, the mounting block 54 is fixedly secured to a post 56 which is freely reciprocal in an aperture 58 in an idler carrier block 60. The idler carrier block 60 is supported on the horizontal shaft 40 by an aperture 62 which affords axial translatory movement of the carrier 60 on the shaft 40 so the idler wheel 48 will float into positive engagement with both the friction disc 46 and the friction drive roller 34. The idler carrier 60 is also movable angularly about the horizontal shaft 40 to afford engagement and disengagement of the idler wheel 48 with friction roller 34 as hereinafter described.

Means are provided to afford angular movement of the axis of the idler wheel 48 with respect to the axis of the shaft 40 to engage and disengage the idler wheel 48 with the drive roller 34 and to afford movement of the idler wheel 48 radially with respect to the friction disc 46. In the disclosed construction the means comprises a control rod 64 which has one end 66 anchored in an aperture 68 in the mower handle 21 and the other end pivotally connected in an aperture 70 in the post 56. The control rod 64 is desirably connected to the mower handle 21 to form an angle A of about 20° to 40° with respect to a vertical plane through the connection of the control rod 64 and the post 56 to obtain sufficient mechanical advantage to move the post 56 as hereinafter described.

Although the disclosed construction utilizes the mower handle as the control lever, a control lever mounted on the mower handle and movable relative to the mower handle can be employed to also achieve at least some of the advantages of the invention.

As best shown in FIG. 3, when the mower handle 21 is in its rearwardmost or a first position, the rod 64 positions the idler wheel 48 at a position relative to the shaft 40 such that the idler wheel 48 is disengaged from the friction drive roller 34, thus providing a neutral condition.

As the handle is moved forwardly to a second position shown in solid lines in FIG. 4, the idler 48 engages the friction drive roller 34 and transfers power to the friction disc 46 and thus the rear wheels. As the mower handle is moved further forwardly from the second position to a third position shown in broken lines in FIG. 4, the rod 64 causes vertical movement of the post 56 and radial movement of the idler wheel 48 toward the axis or center of the friction disc 46 to progressively decrease the drive ratio between the drive roller 34 and the friction disc 46 to increase the rate of rotation of the mower wheels 22.

When the handle 21 is released, the handle 21 will return to the first position under gravity biasing to disengage the idler wheel 48. Alternative constructions can include spring biasing to return the handle to the first position.

Various of the features of the invention are set forth in the following claims.

What is claimed is:

1. A lawn mower comprising an engine having an output shaft, a mower housing supporting said engine, a pair of wheels rotatably supporting said housing for travel in adjacent relation to the ground, a cross-shaft rotatably mounted on said mower housing, means for drivingly connecting said cross-shaft to one of said mower wheels, a mower handle pivotally connected to said housing to afford movement of said handle between first, second and third positions with said second position intermediate said first and third positions, and means connected to said mower handle for transferring power from said engine output shaft to said cross-shaft, and affording a neutral condition without power transfer from said engine output shaft to said cross-shaft when said handle is in first position, and affording a driving condition providing mower wheel rotation when said handle is in a range of positions between and including said second and third positions, and a change in rate of rotation between said engine output shaft and said mower wheels, as said handle is moved between said second and third handle positions.

2. A lawn mower in accordance with claim 1 wherein said means for transferring power from said engine output shaft to said cross-shaft comprises an intermediate shaft, means for rotatably supporting said intermediate shaft on said mower housing, means for drivingly connecting said intermediate shaft to said engine output shaft, first drive means on said intermediate shaft, second drive means on said cross-shaft, idler means, and means for supporting said idler means on said cross shaft to provide a rotational axis of said idler means radial with respect to said cross-shaft and to afford axial and angular displacement of said idler means relative to said cross-shaft, said means for mounting said idler means further affording translatory movement of said idler means in a radial direction with respect to said second drive means, and means connected to said mower handle and connected to said means for mounting said idler means to afford angular displacement of said idler means about said cross-shaft upon movement of said handle from said first position to said second position to engage said idler means with said first and second drive means, and to move said idler means radially with respect to said second drive means upon movement of said handle from said second position to said third position thereby changing the rate of rotation between said intermediate shaft and said cross-shaft.

3. A lawn mower in accordance with claim 1 wherein said means for drivingly connecting said cross-shaft to one of said mower wheels comprises a rim on one of said mower wheels having internal teeth and gear means on said cross-shaft in mesh with said teeth on said rim.

4. A lawn mower in accordance with claim 2 wherein said means for mounting said idler means comprises a mounting block having a post, a stub shaft supported in said mounting block and rotatably supporting said idler means, an idler carrier block having an aperture receiving said cross-shaft to afford carrier block movement axially and angularly on said cross-shaft, said idler carrier block also including a transverse aperture receiving said post to afford post movement axially of said aperture.

5. A lawn mower in accordance with claim 4 wherein said means for connecting said lawn mower handle to said means for supporting said idler means comprises an aperture in said post and a control rod having an upper end connected to said mower handle and a lower bent portion received in said post aperture.

6. A lawn mower in accordance with claim 5 wherein said connection between said rod and said mower handle is located rearwardly of said post when said mower handle is in the first position and said connection between said mower handle and said mower housing is located forwardly of said idler means.

7. A lawn mower comprising an engine having an output shaft, a mower housing supporting said engine, a pair of wheels rotatably supporting said housing above the ground, a first shaft, means for rotatably supporting said first shaft on said mower housing, means for drivingly connecting said first shaft to said engine output shaft, a second shaft, means for rotatably supporting said second shaft on said mower housing, first drive means on said first shaft, second drive means on said second shaft and having a frictional surface, idler means, means for mounting said idler means on said second shaft to afford angular displacement of said idler means about said second shaft to afford engagement and disengagement of said idler means with said first drive means, said mounting means further affording movement of said idler means in a radial direction with respect to said second drive means to vary the position of engagement of said idler means with said frictional surface to change the rate of rotation between said first shaft and said second shaft to vary the rate of rotation of said mower wheels, a control lever, and means connected to said control lever and to said means for mounting said idler means to afford engagement and disengagement of said idler means with said first and second drive means and to afford change in radial position of said idler means with respect to said second drive means upon movement of said control lever.

8. A lawn mower comprising an engine having an output shaft, a mower housing supporting said engine, a pair of wheels rotatably supporting said housing for travel in adjacent relation to the ground, a cross-shaft extending transversely to the engine output shaft, means for drivingly connecting said cross-shaft to at least one of said wheels, means for rotatably supporting said cross-shaft on said mower housing, an intermediate shaft, means for rotatably supporting said intermediate shaft on said housing, means drivingly connecting said engine output shaft with said intermediate shaft, a mower handle, means for pivotally connecting said mower handle to said housing, first drive means fixedly secured to said intermediate shaft, second drive means fixedly secured to said cross-shaft, idler means, and means supporting said idler means for affording rotation of said idler means, for affording translatory movement of said idler means in a direction transverse to the longitudinal axis of said cross-shaft and for affording translatory movement of said idler means longitudinally of said cross-shaft and for affording angular movement of said idler means about an axis parallel to said cross-shaft.